3,311,468
SILVER RECOVERY PROCESS
Charles Davidoff, 118 Rollinghill Road,
Manhasset, N.Y. 11030
No Drawing. Filed Dec. 26, 1963, Ser. No. 333,635
6 Claims. (Cl. 75—108)

This invention relates to a method for recovering silver, and more particularly to a method for recovering silver from a solution of alkali metal silver cyanide or other silver salt.

It is common knowledge that solutions of silver cyanide complex exist in several fields of industry from which the silver must be recovered for obvious reasons of economy. Thus, in the mining industry, a widely employed method of recovering silver from ore containing the same involves leaching the silver from the ore with an aqueous solution of alkali metal cyanide, a solution of sodium or potassium silver cyanide being thereby obtained. For plating with silver, plating solutions are frequently solutions of sodium or potassium silver cyanide, from which solutions, either new, excess or used, the silver must be recovered. Also, a method of recovering silver from silver alloys such as scrap jewelry and the like involves treatment with an aqueous solution of alkali metal cyanide.

In contrast to the many well established simple procedures for recovering silver from its uncomplexed ionic state such as monovalent silver, no really satisfactory method exists for recovering silver from its alkali metal cyanide complex. According to one presently employed procedure, the solution of silver cyanide complex is first treated, as by vacuum, to remove free oxygen which is needed in conjunction with the alkali metal cyanide to dissolve the silver but which interferes with the subsequent precipitation with zinc. The deoxygenated solution is then treated with zinc dust, usually for several hours and preferably overnight, to precipitate the silver and form a silver-zinc slurry. A small amount of lead acetate is usually added to help coagulate the silver-zinc slurry. The slurry is then filtered, the filter cake is treated with acid to dissolve out the zinc and lead, and the mixture filtered again and the silver filter cake washed free of acid. According to a further improvement on this involved process, and to purportedly diminish or eliminate the need for preliminary deoxygenation of the pregnant solution, the zinc dust is first treated with alkali bisulfite and, desirably, alkali metal cyanide but this improvement obviously fails to eliminate the disadvantages of this process inherent in its overlong duration, plural filtrations, need for acid-proof equipment, etc. Further, any lead precipitated with the silver must be completely removed. Similar considerations apply when this zinc precipitating process is employed for treating the so-called acid silver plating solutions containing the silver cyanide complex buffered with an organic acid such as citric or acetic acid or their ammonium or other alkaline salts to maintain a pH at or below 7.

It is an object of this invention to provide a process for recovering silver from solutions of silver cyanide complex which will not be subject to one or more of the above disadvantages. Another object of this invention is the provision of a new and improved method for recovering silver from such solutions. Still another object of the invention is the provision of such a method which is relatively brief in duration, high in yield, and/or low in cost of labor, materials and/or equipment. A further object is the provision of such a process which may be operated continuously or batchwise as desired. Other objects and advantages will appear as the description proceeds.

The attainment of the above objects is made possible by my method of recovering silver from a solution of alkali metal silver cyanide comprising adding to the solution at least about 0.25 mole of an alkali metal hydrosulfite compound for each mole of silver in the solution, maintaining the resulting solution, preferably at an elevated temperature above about 150° F., until cessation of precipitation of the silver, and removing the precipitated silver from the solution. The above process has been found to constitute a surprisingly simple, economical method of expeditiously recovering silver from solutions of alkali metal silver cyanide in up to 100% yields without the need for the previously required acid-proof equipment. Further, although the said process exhibits its greatest advantages in the treatment of solutions containing the highly stable alkali metal silver cyanide complex, it will be understood that the invention also includes use of such process for recovering silver from solutions of the relatively more unstable silver compounds such as silver fulminate, nitrate and thiosulfate and the like.

As the alkali metal hydrosulfite compounds useful as precipitants in the process of this invention there may be employed an alkali metal hydrosulfite such as sodium or potassium hydrosulfite, or a substance which liberates same in the silver-containing solution such as the addition compounds of an alkali metal hydrosulfite with an aliphatic aldehyde as exemplified by formaldehyde, acetaldehyde and the like. Such addition compounds are commonly known as, respectively, sodium formaldehyde sulfoxylate, sodium acetaldehyde sulfoxylate and the like and the corresponding potassium compounds.

The process of my invention has been found to be highly effective in selectively precipitating silver in substantially pure and readily filterable form from alkali metal silver cyanide solutions containing such other base metals or contaminants also dissolved therein as copper, zinc, nickel, lead, and platinum and the like. Such solutions, as described above, are formed in the cyanide treatment of silver-containing ores and alloys, and in electroplating processes employing the silver cyanide complex. By way of example, solutions of this type are formed in the porous cup technique for electrolytically dissolving silver-base metal alloys according to which the alloy is used as anode in an electrolyte of alkaline cyanide such as sodium or potassium cyanide while the cathode is shielded by a porous cup to prevent the silver from plating thereon. The resulting electrolyte to be treated by the process of this invention therefore contains dissolved therein the silver, as cyanide complex, and base metals originally present in the alloy. If any slight amounts of such base metals precipitate with the silver, they may be readily leached out by treating the precipitate with acid, if their presence in the recovered silver is prohibited. Any gold present in the silver cyanide solution will be precipitated with the silver by the present process, but can be readily separated from the silver, for example by leaching the silver from the precipitate with nitric acid and then treating the resulting silver nitrate solution by the process of this invention or by any other known process. This method of recovering gold from solutions of alkali metal gold cyanide is disclosed and claimed in my copending application Ser. No. 333,717 filed on even date herewith entitled, "Gold Recovery Process." The gold can of course be allowed to remain with the silver if desired.

In carrying out the process of this invention, the alkali metal hydrosulfite compound, or mixture thereof, is added to the silver cyanide solution in molar proportions relative to the silver in the solution of at least about 0.25:1 or more, usually about 0.5–5:1 and optimally about 0.5–1:1. It is always preferable to employ an excess of the precipitant, which is relatively inexpensive, to ensure recovery of all the silver in the solution. The rate of precipitation varies directly with the temperature, and for practical purposes, the solution containing the silver cyanide and precipitant should be maintained at elevated temperatures of about 150° F. up to the boiling point, and preferably about 180–200° F. until cessation of precipitation of the silver which may take from about 5 minutes to 2 hours and usually about ¼ to ½ of an hour. The process is substantially independent of the pH of the solution which may range from about 14 for the highly alkaline solutions down through neutrality to about 3 in the case of solutions buffered with phosphates and/or carboxylic acids such as citric, acetic, etc. Similarly, the process is operative on solutions containing any amount or concentration of alkali metal silver cyanide, the minimum concentration being established in any particular instance by economic factors; unless dictated by other considerations, silver concentrations so low as to result in the value of the recovered silver being below the cost of the recovery process would ordinarily not be employed herein. The maximum operative concentration is of course that of a saturated solution. As will be readily understood, the attainment of optimum results will be dependent on proper adjustment, determinable by routine experimentation, of the temperature and duration of treatment, proportions of precipitant to silver, identity of the precipitant, pH of the solution, etc. Thus, an alkali metal hydrosulfite generally yields better results with alkaline solutions while an alkali metal formaldehyde or acetaldehyde sulfoxylate is generally better for neutral or acid solutions.

The precipitant may be added to the silver cyanide solution in dry form or previously dissolved in water, and the process may be carried out batchwise or continuously by metering the precipitant continuously into a flowing stream of the silver cyanide solution, previously heated if desired, in the required proportions, maintaining the stream containing precipitant and silver cyanide, preferably at the above-described elevated temperatures, for a sufficient time to permit completion of precipitation of the silver, and continuously filtering off the precipitated silver. If desired, there may also be added, in minor amounts relative to the hydrosulfite precipitant, other additives such as dextrose and other carbohydrates, hydroxylamine and other hydroxyl-containing amines and their hydrochlorides and sulfates, ammonium, sodium and potassium hypophosphites, orthophosphates and polyphosphates, and ethylenediamine mono-, di-, tri-, and tetra-acetic acid and other amino- and hydroxy-carboxylic acids and their ammonium, sodium and potassium salts.

The following examples are only illustrative of the invention and are not to be regarded as limitative. All parts and proportions referred to herein and in the appended claims are by weight unless otherwise indicated.

*Example 1*

The following materials are dissolved in water to make 100 cc. of solution having a pH of 11.0:

| | Grams |
|---|---|
| Silver cyanide | 4.5 |
| KCN | 4.5 |
| $K_2CO_3$ | 1.5 |
| KOH | 0.4 |

To this solution, heated to 180–200° F., is added 0.4 gram of sodium hydrosulfite and the solution stirred for about 15 minutes, at which time precipitation is complete. The precipitate is then filtered off, weighed and analyzed. It is found to be substantially 100% silver and to contain substantially all the silver in the solution, i.e. a 100% yield.

*Example 2*

The procedure of Example 1 is repeated but using the following materials yielding a solution having a pH of 10.8:

| | Grams |
|---|---|
| Silver cyanide | 4.5 |
| KCN | 4.5 |

Similar results are obtained.

*Example 3*

The procedure of Example 1 is repeated but using the following materials yielding a solution having a pH of 8.7:

| | Grams |
|---|---|
| Silver cyanide | 4.5 |
| KCN | 4.5 |
| Citric acid | 1.0 |

Further, sodium formaldehyde sulfoxylate is employed as precipitant instead of sodium hydrosulfite. Similar results are obtained.

*Example 4*

The procedure of Example 1 is repeated but using sodium acetaldehyde sulfoxylate as precipitant, and the following materials yielding a solution having a pH of 4.6:

| | Grams |
|---|---|
| Silver cyanide | 4.5 |
| KCN | 4.5 |
| Citric acid | 35.0 |

Similar results are obtained.

When NaCN, $Na_2CO_3$ and NaOH are employed in the above examples instead of the corresponding potassium compounds, similar results are obtained. Equivalent results are obtained when the process of the invention is applied to the above-described solutions in the examples using potassium instead of sodium as the alkali metal in the hydrosulfite precipitant. Similarly improved results are obtained when applying the present process to the various alkali metal silver cyanide solutions present in industry, which solutions need no preliminary deoxygenation as ordinarily required with presently employed silver recovery processes.

To confirm the selective action of the present process, a solution in water is prepared containing copper cyanide, nickel cyanide, potassium silver cyanide, potassium gold cyanide, potassium cyanide, dibasic potassium phosphate, and KOH. This solution is treated in accordance with the present process using sodium hydrosulfite as precipitant. Analysis of the precipitate establishes that all the gold and silver has been precipitated but none of the copper or nickel.

This invention has been disclosed with respect to certain preferred embodiments, and it will be understood that various modifications and variations thereof will become obvious to persons skilled in the art and are to be included within the spirit and purview of this invention and application and the scope of the appended claims.

I claim:

1. A method of recovering silver from an aqueous solution of alkali metal silver cyanide comprising adding to the solution about 0.5 to 1 mole of a water soluble addition product of an aliphatic aldehyde with an alkali metal hydrosulfite for each mole of silver in the solution, maintaining the resulting solution at an elevated temperature above about 150° F. until cessation of precipitation of the silver, and removing the precipitated silver from the solution.

2. A method as defined in claim 1 wherein said addition product is sodium formaldehyde sulfoxylate.

3. A method as defined in claim 1 wherein said addition product is sodium acetaldehyde sulfoxylate.

4. A method of recovering silver from an aqueous solution of alkali metal silver cyanide consisting essentially in the consecutive steps of adding to the solution at least about 0.25 mole of a water soluble addition product of an aliphatic aldehyde with an addition product for each mole of silver in the solution, maintaining the resulting solution at an elevated temperature above about 150° F. until cessation of precipitation of the silver, and removing the precipitated silver from the solution.

5. A method as defined in claim 4 wherein said addition product is sodium formaldehyde sulfoxylate.

6. A method as defined in claim 4 wherein said addition product is sodium acetaldehyde sulfoxylate.

References Cited by the Examiner

UNITED STATES PATENTS

| | | | |
|---|---|---|---|
| 555,463 | 2/1896 | MacArthur et al. | 75—106 |
| 1,479,542 | 1/1924 | Hirschkind | 75—106 |
| 2,112,298 | 3/1938 | Mills et al. | 75—107 |
| 2,245,217 | 6/1941 | Mowlds | 75—109 |
| 3,215,524 | 11/1965 | Fetscher et al. | 75—106 |

HYLAND BIZOT, *Primary Examiner.*

DAVID L. RECK, *Examiner.*

N. F. MARKVA, *Assistant Examiner.*